United States Patent

[11] 3,554,235

[72] Inventors Detlef Opel
Gehrden;
Karl-Heinz Brinkmann, Hannover,
Germany
[21] Appl. No. 756,611
[22] Filed Aug. 30, 1968
[45] Patented Jan. 12, 1971
[73] Assignee Westinghouse Bremsen-und Apparatebau G.m.b.H.
Hannover, Germany
[32] Priority Sept. 19, 1967
[33] Germany
[31] No. W40625

[54] CONTROL VALVE DEVICE HAVING SEAL RETAINING MEANS
3 Claims, 4 Drawing Figs.
[52] U.S. Cl. .................................................. 137/625.69;
251/360; 85/8.8
[51] Int. Cl. ........................................................ F16k 11/07
[50] Field of Search ........................................... 137/625.11,
.25, .28, .33, .34, .35, .48, .67, .68, .69; 251/O-
ring, 325, 324, 360

[56] References Cited
UNITED STATES PATENTS
| | | | |
|---|---|---|---|
| 1,758,515 | 5/1930 | Heiermann.................. | 85/8.8X |
| 2,415,417 | 2/1947 | Collins et al.................. | 137/625.25X |
| 2,485,504 | 10/1949 | Morgan......................... | 251/324 |
| 2,517,061 | 8/1950 | Von Stackelberg.......... | 137/625.25X |
| 2,910,081 | 10/1959 | Karbowniczek.............. | 251/324X |
| 2,962,770 | 12/1960 | Ingraham...................... | 85/8.8X |

*Primary Examiner*—Henry T. Klinksiek
*Attorneys*—Adelbert A. Steinmiller and Ralph W. McIntire, Jr.

ABSTRACT: A control valve device having seal retaining means, in which the conventional O-rings disposed in ring grooves on the bore of a slide control valve body or on a spool member axially movable in the bore are retained in their respective ring grooves against blowout pressure across the rings by way of a compression ring member installed on the necked portion of the spool member or an expansion ring member installed in a groove on the bore, which ring members include circumferentially, alternately disposed, axially extending, parallel grooves and lands, the lands serving to prevent movement of the O-rings out of their respective ring grooves, and the grooves serving to pass fluid through the bore around the O-rings.

PATENTED JAN 12 1971 3,554,235

INVENTOR
DETLEF OPEL
KARL-HEINZ BRINKMANN
BY Ralph W. McIntire Jr.
ATTORNEY

CONTROL VALVE DEVICE HAVING SEAL RETAINING MEANS

BACKGROUND OF THE INVENTION

The O-ring has been proven as a very effective sealing element. However, when used in a control valve of the slide type, such as a spool valve, the O-ring has a tendency to be blown out of its ring cavity when the necked portion of the spool member or the ring cavity on the bore adjacent the port communicating with the bore is disposed concentrically with the O-ring to pass fluid through the bore and past the O-ring from one port to another, resulting in damage to the O-ring or the valve or both.

Heretofore, it has been proposed to retain the O-rings in their respective cavities by providing on the necked portion of spool valve member series of alternately disposed axially extending lands and grooves, integral with the spool valve member so that when the O-rings were disposed concentrically with the lands and grooves, the lands retained the rings in their respective grooves, and the grooves passed fluid axially of the bore from the ring port on one side of the O-ring to the low pressure or zero pressure ring port on the other side of the O-ring. The disadvantages of this structure reside in the high manufacturing expense.

SUMMARY OF THE INVENTION

Accordingly, it is the object of the present invention to provide an O-ring retaining means which is simple in structure, inexpensive to manufacture and easy to install.

In accordance with the present invention, this object is achieved by providing on the surface of a resilient split-ring member a series of axially extending grooves spaced circumferentially of the split ring to form axially extending lands therebetween. In the slide valve of the type having O-rings disposed in ring grooves in the valve body bore, the split-ring member is in the form of a compression ring installable on the necked portion of the spool valve member between the control edges of the spool valve member, the grooves and lands being disposed on the outer periphery of the split ring. In the slide valve of the type having O-rings disposed on ring grooves on the spool valve member, the split ring is in the form of an expansion ring installable in a ring cavity between the control edges in the valve body bore, the groove and lands being disposed on the inner periphery of the split ring. The split ring, being a separate article of manufacture, may be composed of any suitable inexpensive resilient material, as, for example, polyethylene.

This and other objects of the invention will become more readily apparent in the following description, taken in conjunction with the drawing, in which.

Figure 1:
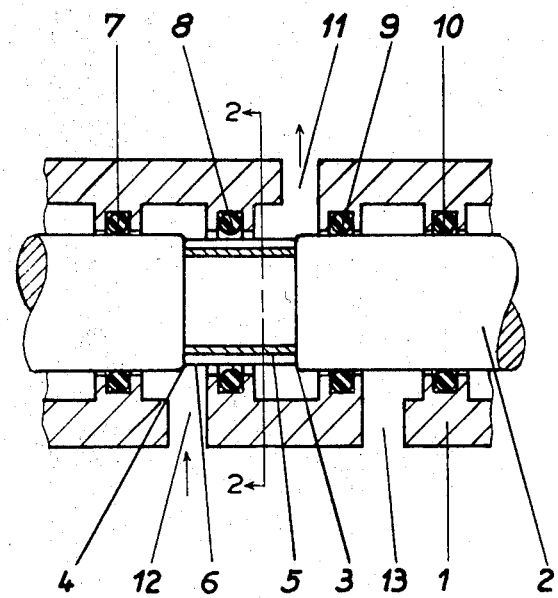
FIG. 1 is a cross-sectional view of a control valve device showing the seal retaining means of our invention installed on the spool valve member.
Figure 2:
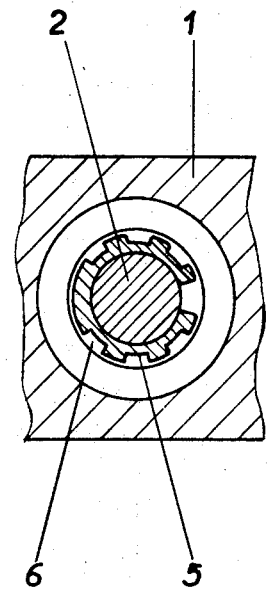
FIG. 2 is a crow cross-sectional view thereof taken substantially along the line 2—2 of FIG. 1.

Referring now to FIGS. 1 and 2 of the drawing, there is shown a valve housing or body 1 having a control slide or spool valve member 2 disposed for axial movement in a bore therein. Disposed on the necked portion of the spool member and limited by the control edges 3 and 4 of the spool valve lands is a compression split-ring member 5 comprised of a resilient material such as polyethylene, the split-ring member having disposed on its outer circumference a plurality of axially extending grooves 6 spaced circumferentially of the split ring to form alternately disposed lands and grooves.

The split-ring 5, being composed of resilient material, is assembled on the spool member 2 by spreading apart the ends of the ring a distance at least equal to the diameter of the necked portion whereupon release of the ring ends effects a resilient clamping installation of the split ring on the necked portion of the spool valve member, as best seen in FIG. 2. Preferably, the axial length of the split ring equals the length of the necked portion.

The O-rings 7, 8, 9 and 10 are each disposed in a corresponding ring groove in the housing bore as sealing elements effecting a seal between the housing and the lands on the spool member. A plurality of ports 11, 12 and 13 through the housing control fluid flow through the bore in a direction in accordance with fluid pressure and the relative axial position of the spool member 2.

Since the split-ring 5 encircles the necked portion of spool member 2 by a clamping force, no additional securement is necessary. Preferably, the grooves 6 on the split ring are equally spaced one from the other. However, it is to be understood that the grooves may be unequally spaced, it being necessary only that the lands between the grooves 6 positively abut the inside diameter of the O-rings before the O-rings can be blown out of their respective ring grooves. It is to be noted that the outside diameter of the split-ring at the lands need not be as large as the inside diameter of the O-rings. So long as the relative diameters prevent the O-rings from being blown out of their respective grooves, some freedom of radial movement of the O-rings is permissible.

In now describing the operation of the O-ring retaining means in the control valve device of FIGS. 1 and 2, it will be observed that the control slide or spool member 2 is disposed in the left end position so that fluid pressure at port 12 flows axially through the bore and grooves 6 of the split-ring 5 past the O-ring 8 to port 11, while O-ring 9 seals off port 13 relative to ports 11 and 12.

If now the control slide or spool 2 is disposed in the right end position, it will be apparent that O-ring 9 is retained in its ring groove by the lands on split-ring 5 as soon as the control edge 3 and the corresponding land on spool member 2 disengages therewith. At the same time, the fluid pressure at port 13 effects fluid flow to port 11 by way of grooves 6 in the split-ring 5. The fluid flow at port 12 is closed off by means of O-ring 8 now sealingly engaging a land on the spool member 2.

If now the spool member 2 is moved to the left-end position, the lands on split-ring 5 retain the O-ring 8 in its ring groove as soon as the control edge 4 and the corresponding land disengages therewith.

Figure 3:
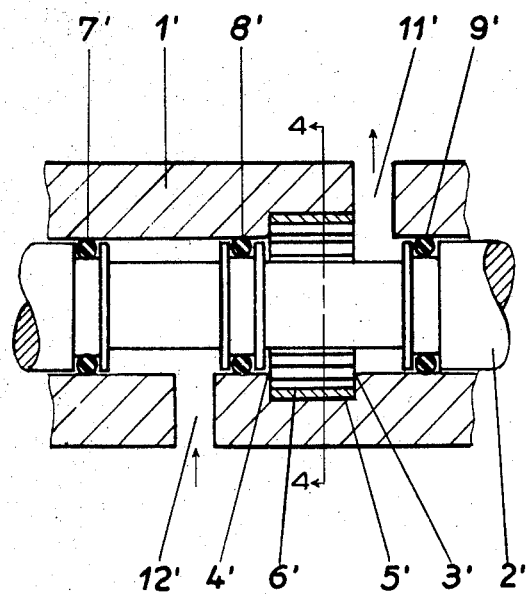
FIG. 3 is a cross-sectional view of a control valve device showing a second embodiment of the seal retaining means of our invention.
Figure 4:
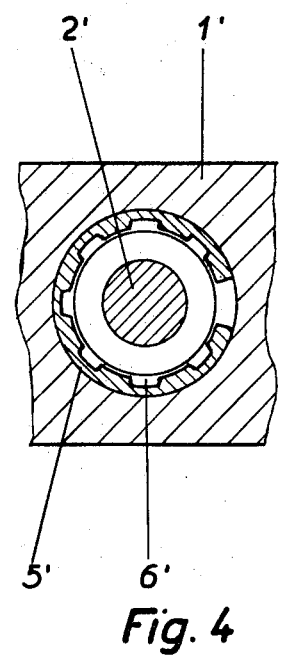
FIG. 4 is a cross-sectional view of the device of FIG. 3 taken substantially along the line 4—4.

Referring now to FIGS. 3 and 4 of the drawing, there is shown a valve housing 1' having a slide or spool valve member 2' disposed for axial movement in a bore therein. An expansion ring 5' of the split-ring type is disposed in a ring cavity of the housing bore, which ring cavity is bordered by control edges 3' and 4', and includes on the inner diameter thereof a plurality of axially extending, circumferentially spaced grooves 6' forming alternately disposed grooves and lands. The O-rings 7', 8' and 9' are disposed in individual ring grooves on the spool valve member 2' to serve as sealing elements between the bore and the spool member. The valve housing includes ports 11' and 12'. The split-ring member 5' is composed of the same resilient material discussed above with respect to FIGS. 1 and 2, and is assembled in its ring groove or cavity in the bore by compressing the ring ends together, inserting the ring in the ring cavity and releasing the ring ends whereupon the outer diameter of the split ring is resiliently enlarged until forced to a tight fit in the ring cavity, thereby eliminating the need for any additional securement.

As discussed above with respect to FIGS. 1 and 2, the grooves 6' in the ring may be equally or unequally spaced.

The manner of operation of the split-ring 5' of FIGS. 3 and 4 will be obvious by analogy with the previously described operation of the split-ring 5 in FIGS. 1 and 2.

I claim:

1. A control valve device having seal retaining means, comprising:

a. a pair of relatively axially movable members comprising a valve housing member having a bore therein and a spool valve member disposed in said bore for axial movement relative to said valve housing member;

b. a pair of ports in said housing member communicating with said bore in an axially spaced position;

c. a circumferential groove on one of said members disposed between said pair of ports and having a ring of yieldable material therein;

d. a first circumferential surface on the other of said members having a diameter such that when concentrically disposed with said ring engages said ring to seal off fluid flow through the bore from one of said pair of ports to the other;

e. a second circumferential surface on said other of said pair of members axially juxtaposed with said first circumferential surface and having a diameter such that when concentrically disposed with said ring provides a radial clearance between said ring and said second circumferential surface;

seal retaining means on said second circumferential surface, comprising:

i. a split-ring member comprised of resilient material and disposed in resilient engagement with said second circumferential surface, and ii. axially extending grooves and lands on one surface of said split-ring member, said lands extending radially toward said ring to prevent said ring from being blown out of said circumferential groove, and said axially extending grooves providing a flow path around the ring through the bore from one of said pair of ports to the other.

2. A control valve device having seal retaining means, as recited in claim 1, in which:

a. said one of said pair of members comprises said housing member;

b. said diameter of said second circumferential surface is smaller than said diameter of said first circumferential surface;

c. said split-ring member comprises a compression ring; and d. said grooves and lands are disposed of the outer peripheral surface of said split-ring member.

3. A control valve device having seal retaining means, as recited in claim 1, in which:

a. said one of said pair of members comprises said spool valve member;

b. said diameter of said second circumferential surface is larger than said diameter of said second circumferential surface;

c. said split-ring member comprises an expansion ring; and d. said grooves and lands are disposed on the inner peripheral surface of said split ring.